United States Patent
Lee et al.

(10) Patent No.: US 6,429,380 B1
(45) Date of Patent: Aug. 6, 2002

(54) ADJUSTABLE BUS BRACING SPACER AND METHOD

(75) Inventors: Gregory B Lee, Elgin, SC (US); Ronald Lee Robinson, Murfreesboro, TN (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/748,603

(22) Filed: Dec. 22, 2000

(51) Int. Cl.[7] .............................................. H01B 17/00
(52) U.S. Cl. .............................. 174/138 G; 174/166 S; 361/804
(58) Field of Search ......................... 174/138 D, 138 E, 174/138 G, 157, 166 S; 361/804

(56) References Cited

U.S. PATENT DOCUMENTS 4,883,382 A * 11/1989 Mushya ................... 174/138 D
5,223,674 A * 6/1993 Reznikov ................ 174/138 D
5,825,633 A * 10/1998 Bujalski et al. ......... 174/138 G

* cited by examiner

*Primary Examiner*—Dean A. Reichard
*Assistant Examiner*—Adolfo Nino
(74) *Attorney, Agent, or Firm*—David R. Stacey; Larry T. Shrout; Larry I. Golden

(57) ABSTRACT

An adjustable height spacer for providing rigid support and insulation between the bus bars of an electrical panel. The spacer is adjustable in height to provide various distances between the bus bars. The spacer includes a pair of body members that are axially aligned. A repeating series of teeth of various heights is defined around the margin of each body member at one end. The teeth are configured such that when the toothed ends of two body members having identical tooth patterns are mated, the teeth operatively engage each other to provide a secure coupling when the body member is placed under a compressive force. The height of the body member is varied by rotating one body member with respect to the cooperating body member such that a selected set of teeth within the series is engaged.

20 Claims, 4 Drawing Sheets

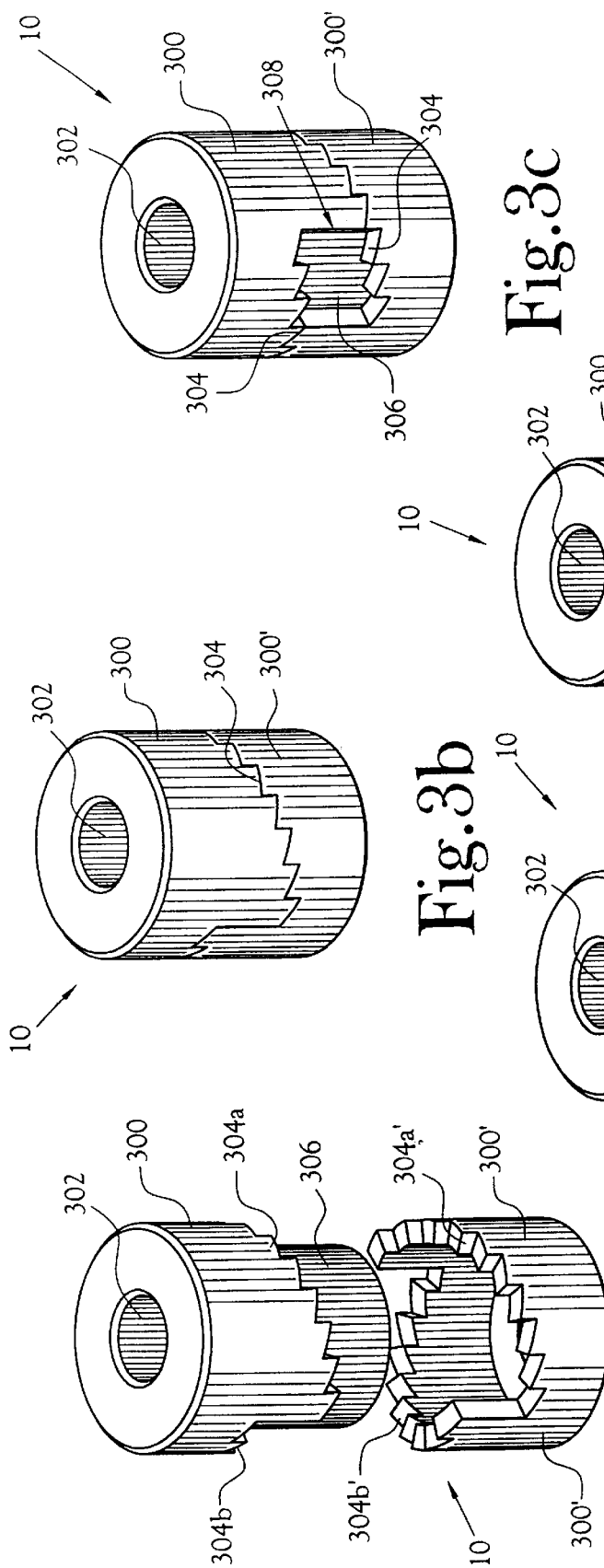

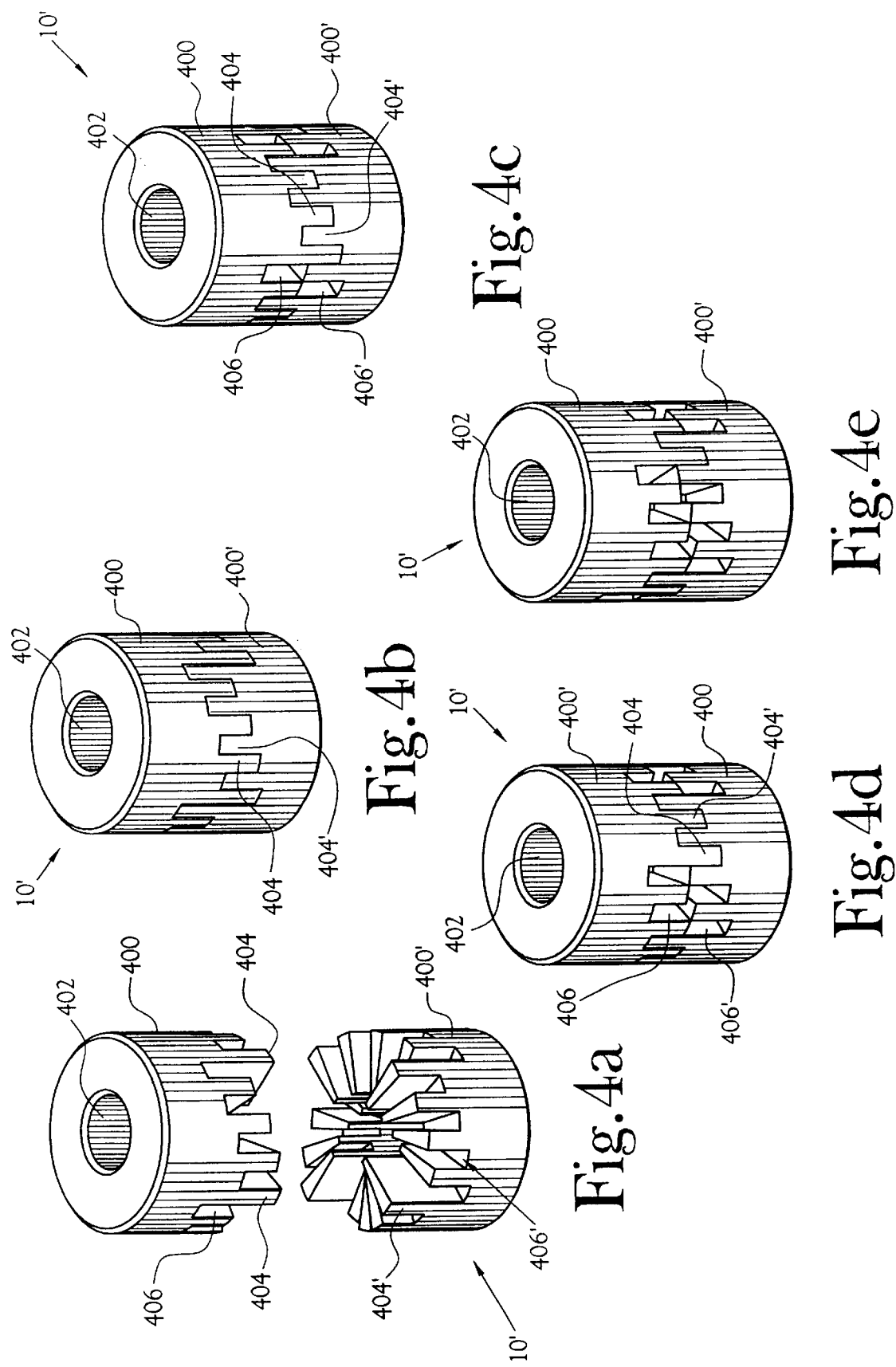

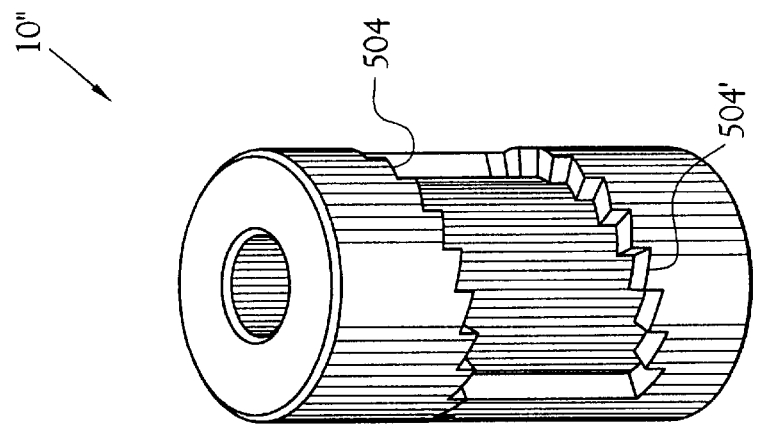
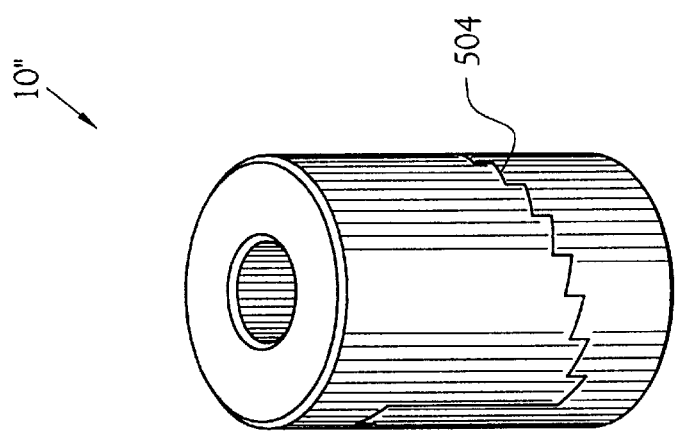
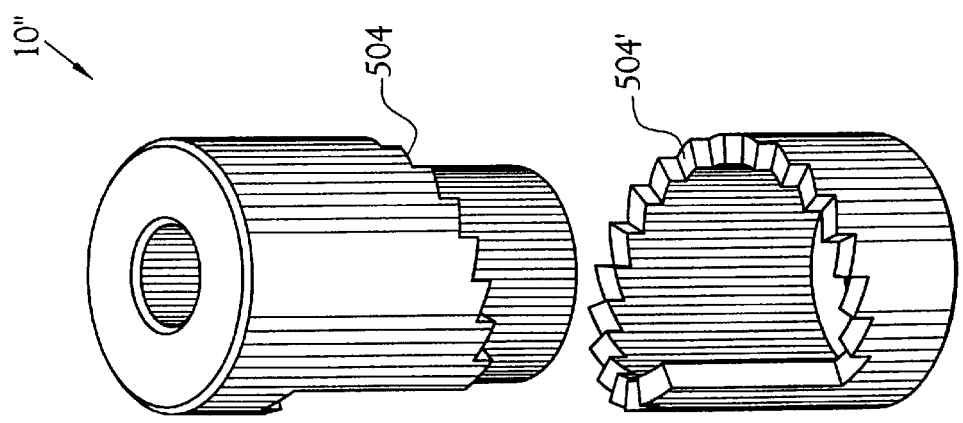

ADJUSTABLE BUS BRACING SPACER AND METHOD

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of Invention

The invention relates to a spacer for separating bus bars in an electrical panel. More specifically, this invention relates to an adjustable spacer that can be reconfigured to various heights.

2. Description of the Related Art

In a typical electrical panel, such as a switchboard or switchgear, a plurality of bus bars are configured in a parallel arrangement with sufficient spacing between them to allow room for the associated wiring lugs on each bus and to prevent arcing between adjacent bus bars. To achieve the separation between and rigid support for the bus bars, an arrangement of bus holders and bus spacers are used. The bus holders and bus spacers are typically provided with a fixed height. When the desired separation distance between the bus bars is a multiple of this fixed height, installation is relatively simple and uses a minimum number of parts. However, when the desired separation is not an exact multiple of the spacer height, a number of various sized spacers must be available to fill the remaining space.

Conventional bus bar spacing of the prior art uses standard bus holders and bus spacers having a length of approximately 1.250 inches. To fill any remaining space which is not a multiple of 1.250 inches, a number of glass polyester spacers having heights between 0.125 and 1.000 inch are used. This requires the equipment installer to have on-hand a large number of spacer components of varying sizes to ensure proper spacing between the bus bars. The spacer arrangement is held in place either through a tight frictional fit, or more commonly, through a bolt passing axially through the spacers from one bus bar to the other.

BRIEF SUMMARY OF THE INVENTION

A spacer for providing rigid support and insulation between the bus bars of an electrical supply panel is disclosed. The spacer is adjustable in height to provide variable distances between the bus bars.

BRIEF DESCRIPTION OF THE SEVERAL VIEWS OF THE DRAWINGS

The above-mentioned features of the invention will become more clearly understood from the following detailed description of the invention read together with the drawings in which:

FIGS. 3a–3e illustrate one embodiment of a spacer of the present invention adjusted to various heights; and FIGS. 4a–4e illustrate an alternate embodiment of a spacer of the present invention adjusted to various heights.

DETAILED DESCRIPTION OF THE INVENTION

A spacer for providing rigid support and insulation between the bus bars of an electrical supply panel is illustrated generally at 10 in the figures. The spacer 10 is adjustable in height to provide various distances between the bus bars. Identical, alternate, and corresponding elements in the figures are generally numbered with the same base element numbers. Where distinction between multiples of identical or corresponding elements is desired, the base element number is appended with either of an alphabetic or prime (') suffix.

Figure 1:
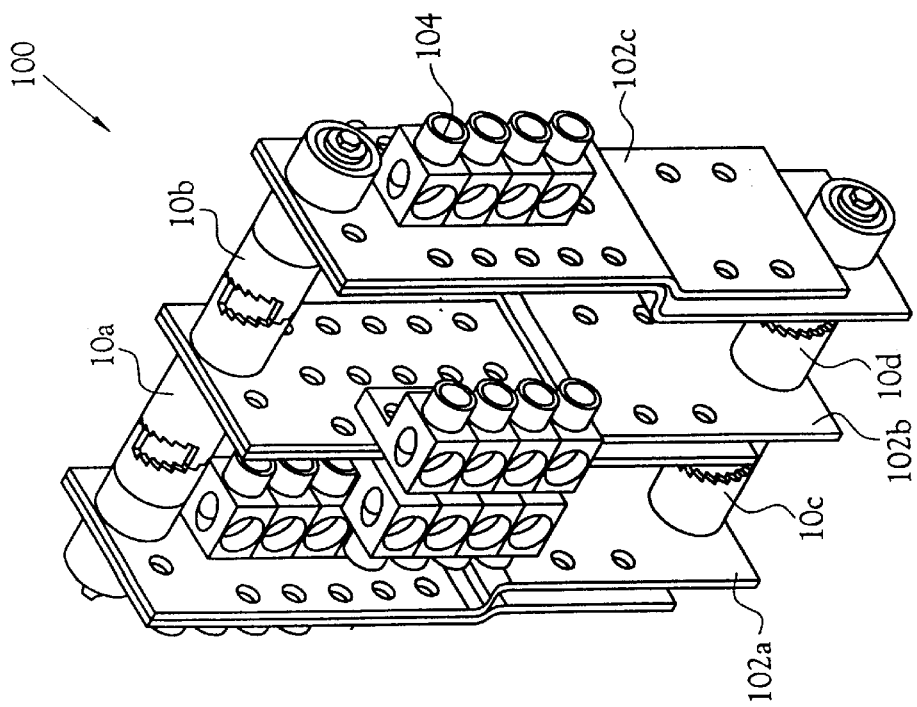
FIG. 1 illustrates a rear perspective view of a typical bus bar arrangement in a conventional electrical supply panel using a spacer of the present invention.

FIG. 1 illustrates a perspective view of a plurality of bus bars 102 in a typical electrical arrangement 100. The bus bars 102 are disposed in a substantially parallel arrangement with sufficient spacing between them to allow room for the associated wiring lugs 104 of conventional design. Separation of and rigid support for the bus bars 102 is accomplished by an arrangement of bus spacers 10.

Figure 2:
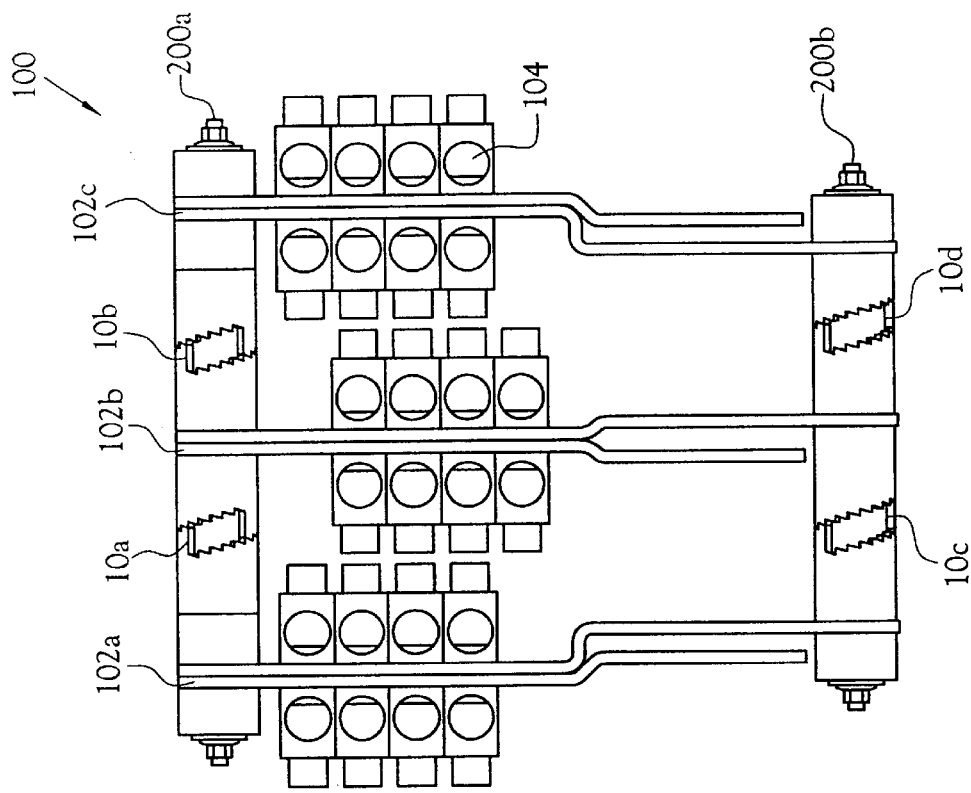
FIG. 2 illustrates a rear elevation view of the bus bar arrangement of FIG. 1.

FIG. 2 illustrates a front elevation view of the bus bars 102 of FIG. 1. The spacers 10a–d are held in place either by compressive forces between the bus bars 102 or, as illustrated in FIGS. 1 and 2, by a bolt 200 passing axially through the spacers 10 from one bus bar 102a to the other 102b and from the bus bar 102b to the bus bar 102c, as shown. It should be noted that the spacing between the top and the bottom of the bus bars 102 varies due to the non-planar shape of the bus bars 102, illustrating the need for an adjustable spacer 10.

FIGS. 3a through 3e illustrate one embodiment of the spacer 10 of the present invention. The spacer 10 includes a pair of body members 300, 300' that are axially aligned. Each body member 300 defines an axial through-bore 302 dimensioned to receive the bolt 200 (see FIG. 2). A series of teeth 304 is defined around the margin of each body member 300 with the series being repeated at least once. In the illustrated embodiment, each tooth 304 has an incrementally increasing height with respect to the previous tooth 304. The teeth 304 are configured such that when the toothed ends of two body members having identical tooth patterns are axially aligned and mated, the teeth 304 operatively engage each other to provide a secure coupling when the body member 300 is placed under a compressive force. The height of the spacer 10 is varied by rotating one body member 300 with respect to the cooperating body member 300' such that a selected set of teeth 304 on each body member is engaged. Those skilled in the art will recognize that the heights need not increment in a linear series.

The embodiment illustrated in FIG. 3a defines a linear series of stepped teeth 304 at increasing heights that extends around substantially a first half of the body members 300, 300' and is repeated around the second half of such members. While the series of teeth extend around half of the body member in the illustrated embodiment, the series could extend around a different portion of the body member if desired. In one embodiment, the tooth height increases so as to allow the height of the spacer 10 to be adjusted between approximately 2.125 and 3.000 inches in 0.125-inch increments. Those skilled in the art will recognize that the dimensions disclosed herein are representative and can be varied as necessary or desired without departing from the spirit and scope of the present invention. In the illustrated embodiment, the first body member 300 has a guide 306, the male part, that is rotatably received within an axial through-opening of the second body member 300', the female part. The spacer 10 defines an axial through-bore, or guide opening, 302 to receive the rod or bolt 200 as it extends through the spacer 10 so as to avoid passing the rod 200 through the opening 308 (shown in FIGS. 3c–3e) between the body members 300, 300' created by the extension of the spacer 10. Those skilled in the art will recognize that the guide 306 provides lateral support in the absence of a through-rod; however, the guide 306 can be omitted where a separate central support member, such as a through-rod, is used. In the illustrated embodiment employing the guide 306, the teeth 304 are defined along the outer wall of the male part 300 surrounding the guide.

FIGS. 3b through 3e illustrate the spacer 10 in various stages of extension. Specifically, FIG. 3b illustrates the spacer 10 at its minimal height with all teeth 304 of the first body member 300 engaged with the corresponding teeth 304' of the second body member 300'. FIG. 3c illustrates the first body member 300 rotated approximately one-eighth of a turn with respect to the second body member 300' such that the first three teeth 304 of each series are not engaged producing a spacer height increase of three increments. FIG. 3d illustrates a rotation of approximately one-quarter of a turn such that the first five teeth 304 of each series are not engaged producing an effective spacer height increase equal to the height of five steps. Finally, FIG. 3e illustrates a rotation of approximately one-half of a turn such that only the last teeth 304 of each series are engaged producing the maximum spacer height (i.e., minimum height plus seven step increments).

FIGS. 4a through 4e illustrate an alternate embodiment of the spacer 10' of the present invention. Each body member 400, 400' defines a repeating series of substantially trapezoidal-shaped teeth 404 of a predetermined width at one end, with each tooth 404 being incrementally taller than the previous tooth 404. Each tooth 404 is separated by a gap 406 configured to receive an engaging tooth 404 of the opposing body member 400, 400'. The bottom of each gap 406 is incrementally spaced from the opposing edge of the body member 400 to provide the spacer height adjustment. However, the gap depth is consistent when measured with respect to either of the taller or the shorter neighboring tooth 404. Also illustrated in FIGS. 4a through 4e, is the guide opening 402 for receiving a lateral support member. FIGS. 4b through 4e illustrate the spacer 10' in various stages of extension.

FIGS. 5a through 5c illustrate the present invention in its simplest embodiment. Each body member 500, 500' of the spacer 10'' defines a single series of teeth 504 that cooperate to provide variable height adjustment.

The spacer 10 is generally constructed of an electrically insulating material such as molded polyester glass. It should be recognized as the height of the spacer increases, fewer teeth engage each other and, therefore, the surface area resisting the compressive forces that can be exerted on the spacer decreases. Accordingly, the electrically insulating material should have sufficient strength and rigidity to resist those compressive forces when the spacer is adjusted to the maximum extension and has the smallest surface area (i.e, the fewest number of teeth) supporting the compressive forces on the spacer. Those skilled in the art will recognize that other electrically insulating materials having sufficient strength and rigidity to withstand the compressive forces that can be exerted on the spacer can be used without departing from the scope and spirit of the present invention.

A number of variations to the present invention are possible without departing from the scope and spirit of the present invention. Those skilled in the art will recognize that the tooth size and shape can vary so long as the teeth of one body member engage the opposing teeth in a secure manner under compressive forces. The number of teeth can be varied to provide a desired number of height adjustments. Similarly, the increment between height adjustments can vary as desired. Further, while the body members are illustrated as tubular cylinders, those skilled in the art will recognize that other shapes that permit selective engagement of height adjusting teeth could be used. Finally, those skilled in the art will recognize that the guide opening can be omitted without departing from the spirit and the scope of the invention.

While several embodiments have been shown and described, it will be understood that it is not intended to limit the disclosure, but rather it is intended to cover all modifications and alternate methods falling within the spirit and the scope of the invention as defined in the appended claims.

Having thus described the aforementioned invention, we claim:

1. A spacer of variable height having a central axis, said spacer for bracing a pair of electrical bus bars in a fixed parallel position, said spacer comprising:
   a pair of body members, each said body member defining a series of teeth of varying heights configured to cooperatively engage said series of teeth of said other body member;
   whereby a selected set of teeth are cooperatively engaged such that a height of said spacer is selected to maintain a fixed distance between said pair of bus bars when secured therebetween.

2. The spacer of claim 1 wherein each said tooth in said series varies in height from each neighboring said tooth.

3. The spacer of claim 2 wherein the variation in height between said neighboring teeth is incremental.

4. The spacer of claim 1 wherein said series of teeth is disposed about a margin of said body member.

5. The spacer of claim 1 wherein one of said body members is rotated about the spacer central axis with respect to the other of said body members and said first and second body members are operatively engaged thereby varying the height of said spacer.

6. The spacer of claim 4 wherein said series of teeth disposed about said margin is repeated at least once.

7. The spacer of claim 1 wherein each said body member defines an axial through-bore which is coaxial with the axial through-bore of the other of said body members.

8. The spacer of claim 1 wherein each said body member is made of an electrically insulating material.

9. The spacer of claim 8 wherein said insulating material is a polyester glass.

10. The spacer of claim 1 wherein one of said pair of body members includes an extension that is rotatably received within an axial through-opening defined by the other of said pair of body members.

11. The spacer of claim 1 wherein each of said pair of body members defines a guide opening configured to receive a rod providing alignment and lateral support.

12. A spacer of variable height for bracing a pair of electrical bus bars in a fixed parallel position, said spacer comprising:
   means for securing said spacer between the pair of bus bars; and
   means for adjusting the height of said spacer to provide variable spacing between the pair of bus bars.

13. The spacer of claim 12 further comprising means for providing alignment and lateral support.

14. The spacer of claim 13 wherein said means for providing alignment and lateral support is an extension defined by one of a pair of body members configured to be rotatably received by the other of said pair of body members.

15. A method for bracing a pair of electrical bus bars in a fixed parallel position using an adjustable spacer comprising two body members, each of the body members having one end defining a repeating series of teeth of varying heights, said method comprising the steps of:

(a) determining a distance between the pair of bus bars;

(b) engaging a first set of the repeating series of teeth from a first body member with a second set of the repeating series of teeth from a second body member to provide the spacer with a selected height;

(c) securing the spacer between the pair of bus bars to fix a position of a first bus bar in relation to a second bus bar;

whereby the pair of bus bars are braced in a fixed parallel position using the adjustable spacer.

16. A spacer of variable height having a central axis, said spacer for bracing a pair of bus bars in a fixed parallel position, said spacer comprising:

first and second body members, each defining a series of teeth of varying height, said series of teeth of said first body member configured to cooperatively engage said series of teeth of said second body member;

whereby a selected set of said series of teeth of said first and second bodies are cooperatively engaged such that a height of said spacer is selected to maintain a fixed distance between said pair of bus bars when said spacer is secured therebetween.

17. The spacer of claim 16 wherein each said tooth in said series of teeth varies in height from each neighboring tooth.

18. The spacer of claim 16 wherein said series of teeth is disposed about a margin of said first and second body members.

19. The spacer of claim 18 wherein said series of teeth can be repeated along said margin of said first and second body members.

20. The spacer of claim 16 wherein said first body member is rotated about the spacer central axis with respect to said second body member such that said selected set of said series of teeth of said first and second body members are cooperatively engaged, thereby varying the height of said spacer.

* * * * *